(12) United States Patent
Masters

(10) Patent No.: US 6,668,787 B2
(45) Date of Patent: Dec. 30, 2003

(54) INTERNAL COMBUSTION ENGINE

(76) Inventor: Roy Masters, 38a Church Street North Creake, Fakenham Norfolk NR21 9AD (GB)

( * ) Notice: Subject to any disclaimer, the term of this patent is extended or adjusted under 35 U.S.C. 154(b) by 0 days.

(21) Appl. No.: 10/262,398

(22) Filed: Oct. 1, 2002

(65) Prior Publication Data

US 2003/0066506 A1 Apr. 10, 2003

(51) Int. Cl.[7] .................................................. F02B 53/00
(52) U.S. Cl. .......................................... 123/245; 418/35
(58) Field of Search ................................ 123/245, 248; 418/35, 36

(56) References Cited

U.S. PATENT DOCUMENTS

| | | | | |
|---|---|---|---|---|
| 1,299,588 A | * | 4/1919 | Luikart | 123/245 |
| 2,804,059 A | * | 8/1957 | Honjyo | 123/245 |
| 3,186,383 A | * | 6/1965 | Potter | 418/35 |
| 3,990,405 A | * | 11/1976 | Kecik | 123/245 |
| 5,009,206 A | * | 4/1991 | Yi | 123/248 |
| 6,341,590 B1 | * | 1/2002 | Barrera et al. | 123/245 |
| 6,446,595 B1 | * | 9/2002 | Sakita | 123/245 |

* cited by examiner

Primary Examiner—Thomas Denion
Assistant Examiner—Thai-Ba Trieu
(74) Attorney, Agent, or Firm—Graham, Curtin & Sheridan; Richard T. Laughlin, Esq.

(57) ABSTRACT

There is provided an internal combustion engine (10) having a housing (11,12,13) and a rotor arrangement (21,22,34) which is mounted for oscillating rotary movement within the housing. The housing provides at least one compression chamber (14) and at least one associated compression chamber (30) and the rotor provides piston means (23, 36) for each chamber. The rotor also has internal passage means for effecting selective communication between the compression and combustion chambers.

22 Claims, 10 Drawing Sheets

INTERNAL COMBUSTION ENGINE

SUMMARY OF THE INVENTION

The present invention relates to internal combustion engines.

According to the present invention there is provided an internal combustion engine comprising a housing and a rotor mounted for oscillating rotary movement therein, the housing defining at least one compression chamber and at least one associated combustion chamber, the rotor defining for each chamber piston means for sealed sliding motion therein to constitute said oscillating rotary movement and the rotor providing internal passage means for effecting selective communication between the or each compression chamber and its associated combustion chamber.

Preferably each cylinder is part-toroidal and its associated piston means is correspondingly part-toroidal for sliding therein and ideally the cylinders are substantially circular in radial cross-section.

In preferred arrangements the rotor comprises a central shaft which extends through the housing and which is supported by means of bearings for rotation relative to the housing and also the housing provides inlet means incorporating one way valves for the passage of fuel mixture to the or each compression chamber and exhaust means for the passage of combustion products from the or each combustion chamber.

In one embodiment the housing provides a pair of identical compression chambers in a common plane, the two compression chambers being oppositely disposed and being separated by a pair of compression bulkheads which extend radially inwardly. Usually each compression bulkhead incorporates said inlet means.

With some of these arrangements said inlet means in each compression bulkhead comprises a radially extending inlet bore which terminates with a cross-bore which opens at one end into one of the compression chambers and at the other end into the other of the compression chambers, the one way valves being disposed in the cross bores to allow passage of fuel mixture only into the compression chambers. Preferably a pair of oppositely disposed compression pistons extend from a first central hub provided on the shaft, the central hub sealingly engaging and rotating relative to the pair of compression bulkheads and each compression piston dividing its compression chamber into first and second parts.

In certain arrangements the internal passage means comprising a through bore in each compression piston the through bore communicating with a radial bore extending inwardly through the piston and through the central hub to an axially extending bore in the shaft and also the ends of each through bore opening into the associated compression chamber each having a one way valve to allow passage of fuel mixture to the radial bore.

Conveniently the housing provides a pair of identical combustion chambers in single plane axially spaced from the common plane of the compression chambers, the two combustion chambers being oppositely disposed and being separated by a pair of identical combustion bulkheads which extend radially inwardly. Ideally the exhaust means comprises an exhaust passage extending substantially radially through the outer periphery of the housing and opening centrally into each combustion chamber.

With preferred arrangements a pair of oppositely disposed combustion pistons extend from a second central hub provided on the shaft, the second central hub sealingly engaging and rotating relative to the pair of combustion bulkheads and each combustion piston dividing its combustion chamber into two parts. In addition the internal passage means further comprises oppositely disposed radially extending openings from the axial bore in the shaft through the second central hub for selective communication with the respective combustion chambers depending on the position of the rotor. Preferably each radial opening in the second central hub opens centrally between the pair of combustion pistons.

In another embodiment the housing provides a compression chamber and an oppositely disposed combustion chamber in a common plane, the chambers being separated by a pair of identical bulkheads which extend radially inwardly. Usually the bulkheads each have an inlet passage opening into the compression chamber via a one way valve.

Preferably the rotor comprise a central shaft and a central hub which sealingly engages and rotates relative to the bulkheads, a compression piston extending from the central hub for sliding oscillation within the compression chamber and a combustion piston extending from the central hub for sliding oscillation within the combustion chamber. In one arrangement the compression piston has a through bore with a one way valve at each circumferential end, which through bore communicates with a radial bore which extends inwardly through the compression piston and through the central hub to the shaft where two radial passages extend through the central hub either to open into the respective combustion chambers or to be blocked by the respective bulkheads depending on the location of the rotor relative to the housing.

Ideally the housing further provides an exhaust opening from the combustion chamber, the opening being centrally disposed between the bulkheads.

BRIEF DESCRIPTION OF THE DRAWINGS

Embodiments of the present invention will now be described in more detail. The description makes reference to the accompanying drawings in which.

Figure 1:
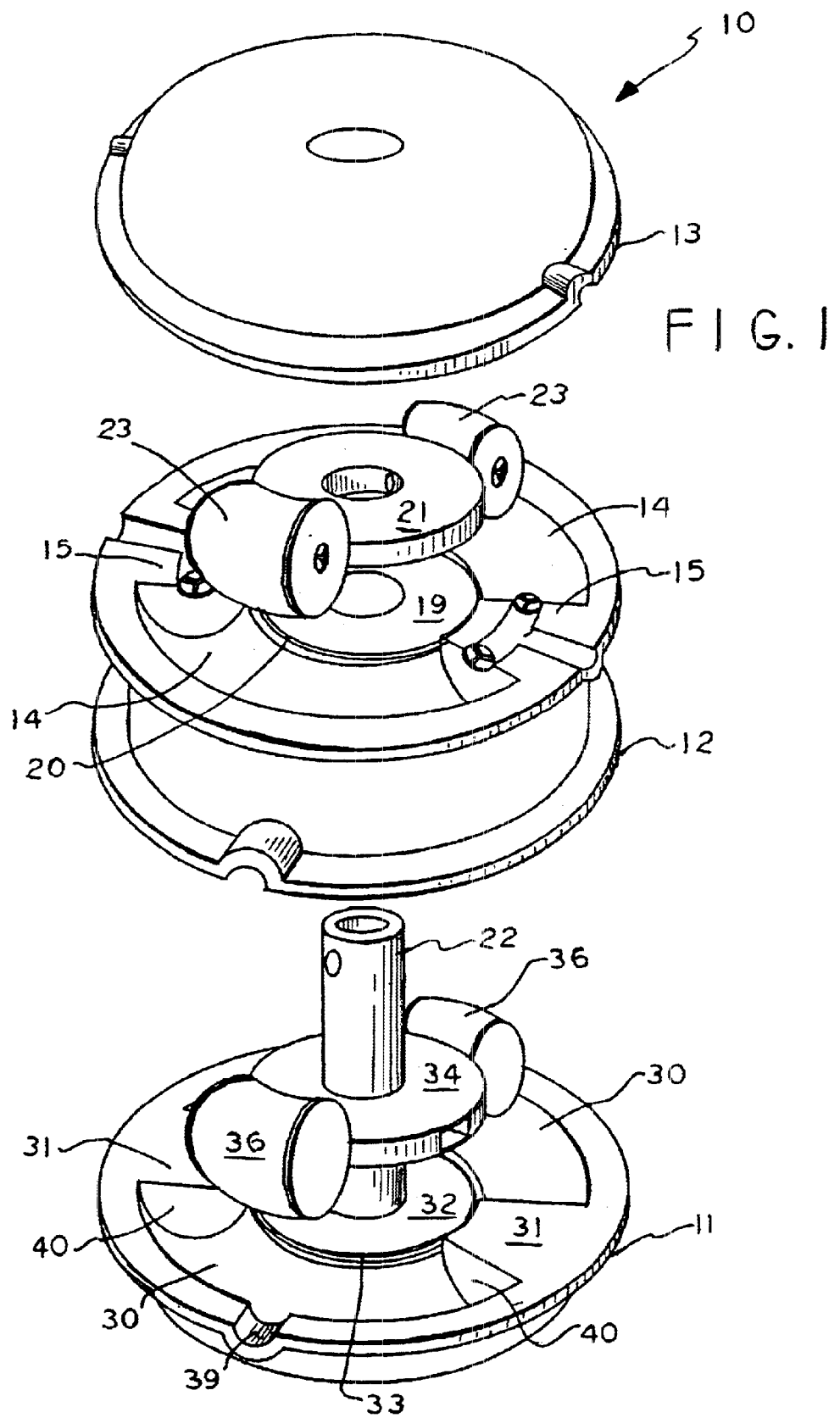
FIG. 1 is an exploded perspective view of an internal combustion engine according to the present invention.
Figure 2:
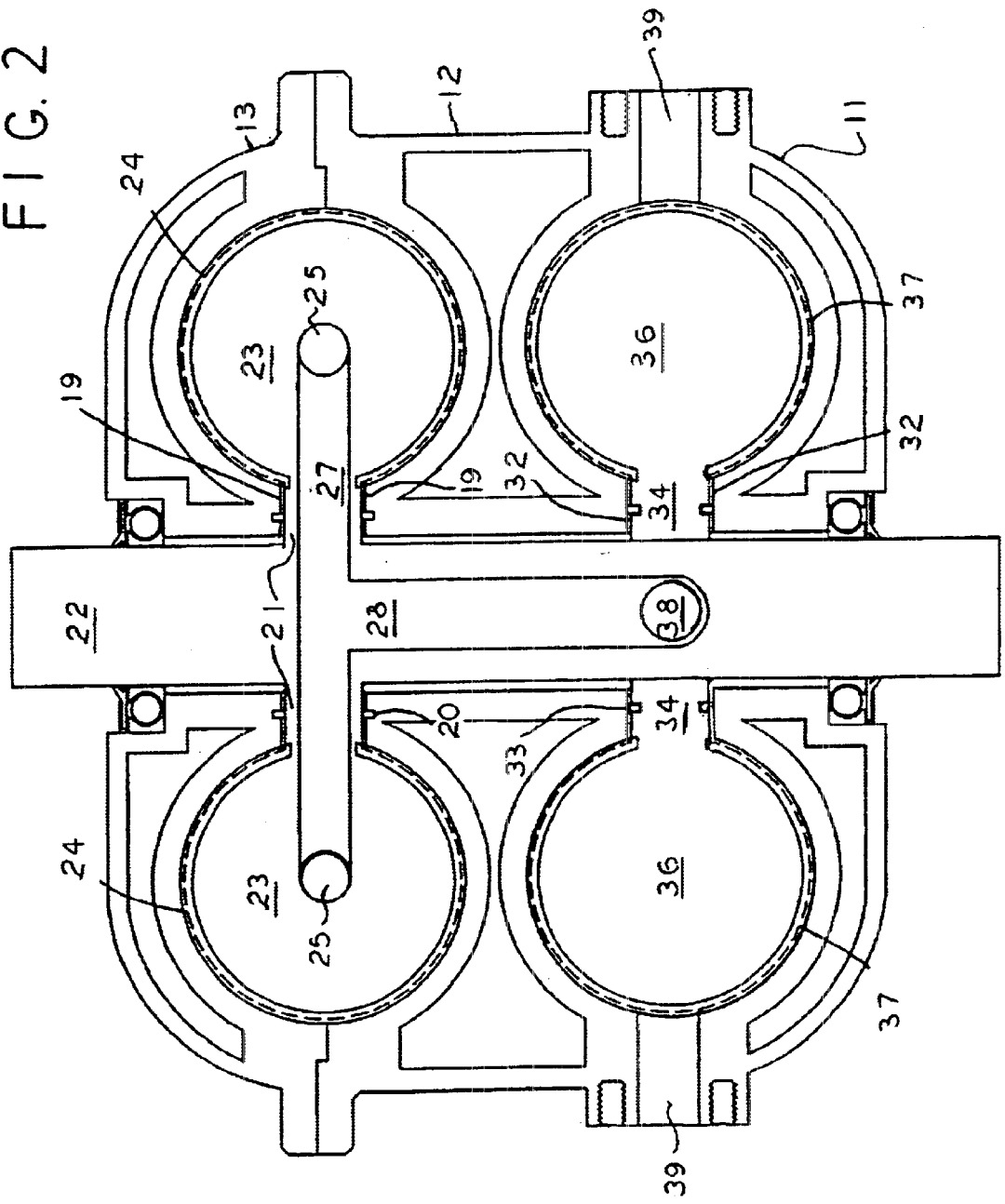
FIG. 2 is a vertical section through the engine of FIG. 1.
Figure 3:
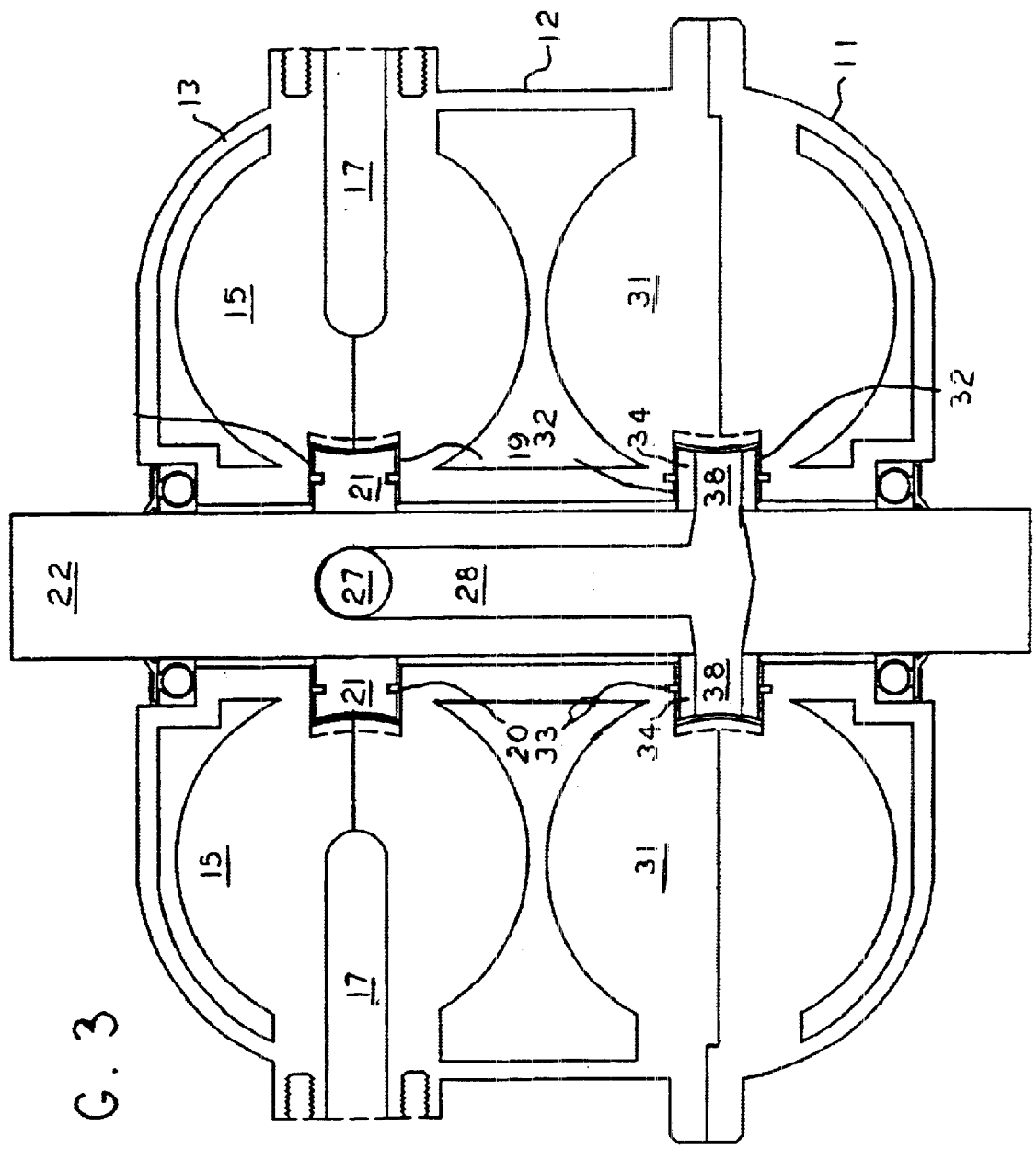
FIG. 3 is another vertical section through the engine of FIG. 1, perpendicular to that of FIG. 2.

Referring first to FIGS. 1 to 11 there is provided an internal combustion engine 10 having a housing arrangement comprising a lower housing 11, a central housing 12 and an upper housing 13. The lower housing 11 and the upper housing 13 being securable to the central housing 12 by means of bolts, for example.

DETAILED DESCRIPTION OF THE INVENTION

The upper housing 13 and one axial face of the central housing 12 define therebetween a pair of oppositely disposed compression chambers 14 separated from each other by a pair of oppositely disposed compression bulkheads 15. The compression chambers 14 are part-toroidal in shape and, in this arrangement, are circular in radial cross-section. Each compression bulkhead has a circumferentially extending cross-bore 16 which communicates with the exterior of the housing by means of a radially extending bore 17. Radially extending bore 17 may be fed with fuel/air mixture or simply air for compression in the compression chambers 14. Each cross-bore 16 communicates with both compression chambers 14 by way of one way valves 18 which allow passage of mixture only into the compression chambers 14.

The central part of the upper and central housings 13, 12, between the compression chambers 14, provide a pair of opposed circular bearing surfaces 19, each incorporating a circular sealing element 20. Between the bearing surfaces is disposed a central hub 21 which is mounted on an axially extending main shaft 22 which extends centrally through the engine. The central hub 21 is able to rotate between the bearing surfaces 19 and sealingly engages the pair of compression bulkheads 15. Extending from the opposite sides of the central hub 21 are part-toroidal compression pistons 23, each of which has a circular cross-section corresponding to the cross-section of the compression chambers 14 for rotary sliding movement therein about the central axis of the engine.

A circular seal 24 is provided at each circumferential end of each compression piston 23 for sealing said rotary sliding movement in the compression chambers 14. The compression chambers 14 are, therefore, divided into opposed first compression chambers 14a and second compression chambers 14b. Each piston 23 has a circumferentially extending through-bore 25 which opens into adjacent first and second compression chambers 14a, 14b by way of one way valves 26 which allow passage of mixture only into the piston 23. Each through-bore communicates with a radial bore 27 which extends through the piston 25, through the central hub 21 and into an axial bore 28 provided in the main shaft 22.

The lower housing 11 and the other axial face of the central housing 12 define therebetween a pair of oppositely disposed combustion chambers 30 separated from each other by a pair of oppositely disposed combustion bulkheads 31. The combustion chambers 30 are part-toroidal in shape and, in this arrangement, are circular in radial cross-section. The central part of the lower and central housings 11, 12, between the combustion chambers 30, provide a pair of opposed circular bearing surfaces 32, each incorporating a circular sealing element 33. Between the bearing surfaces 32 is disposed a central hub 34 which is mounted on the main shaft 22. The central hub 34 is able to rotate between the bearing surfaces 32 and sealingly engages the pair of combustion bulkheads 31, seals 35 being provided at both circumferential ends of each combustion bulkhead 31 for engagement with the central hub 34. Extending from opposite sides of the central hub 34 are part-toroidal combustion pistons 36, each of which has a circular cross-section corresponding to the cross-section of the combustion chambers 30 for rotary sliding movement therein about the central axis of the engine.

A circular seal 37 is provided at each circumferential end of each piston 36 for sealing said rotary sliding movement in the combustion chambers 30. The combustion chambers 30 are, therefore, divided into opposed first combustion chambers 30a and second combustion chambers 30b.

In the central hub there is a radial extending passage 38 which extends from the axial bore 28 in the main shaft 22 and opens midway between the two combustion pistons 36. The circumferential distance between the pair of seals 35 in each bulkhead is greater than the circumferential length of the passage 38 where it opens at the radially outer surface of the central hub 34.

Extending outwardly through the housing from each combustion chamber 30 is an exhaust opening 39 which is centrally disposed between the combustion bulkheads 31. The main shaft 22, central hubs 21, 34 and pistons 23, 36 together form a rotor which rotates as a single unit.

If the engine is to be run on petrol then an ignition means, such as a spark plug, will need to be provided perhaps in the circumferential end surfaces 40 of the combustion bulkheads 31. The compression section can work on an air/fuel mixture ready for combustion or can work on an air mixture which will need fuel injection means to be provided in the combustion section. No specific details of this are provided but will be apparent to the skilled reader. If, however, the engine is to be run on diesel fuel then ignition means may not be necessary, the compression of the fuel mixture in the combustion chambers being sufficient to combust the fuel mixture in the known manner.

The operating cycle of the engine can now be described in more detail, looking initially at the compression chambers. Fuel/air mixture enters the engine by way of radial bores 17. Assuming that the compression pistons 23 are moving in a clockwise direction fuel/air is drawn into the pair of first compression chambers 14a through the respective one way valves 18 in the compression bulkheads 15. When the compression pistons 23 reach the clockwise end of their travel, which is determined by the compression ratio of the compression chambers 14, they return in an anti-clockwise direction compress the mixture in the first compression chambers 14a which then passes through the respective one way valves 26 located in the pistons 23. (Whilst this is occurring in first compression chambers 14a, mixture is being drawn into the second compression chambers 14b). The mixture passes into the bores 25, 27 in the pistons and into the axial bore 28 in the main shaft 22. The mixture is temporarily held in these bores whilst the opening of each radial passage 38 of the central hub of the combustion section is disposed between the pair of seals 35 in the respective combustion bulkheads 31, until it is required in a combustion chamber. The combined bores 25, 27, 28, 38 effectively act as a reservoir for compressed mixture, prior to use in a combustion chamber.

Figure 5:
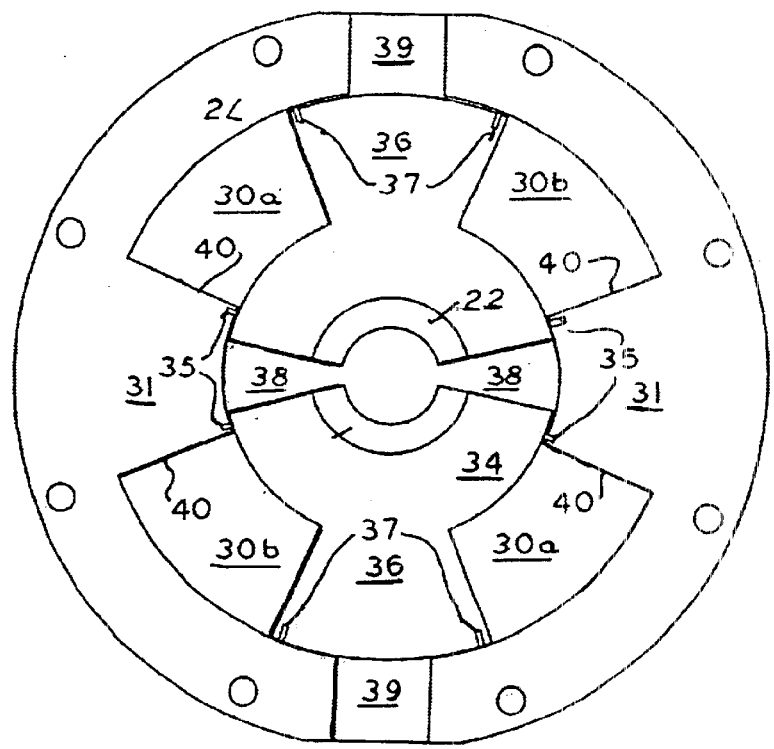
Figure 4:
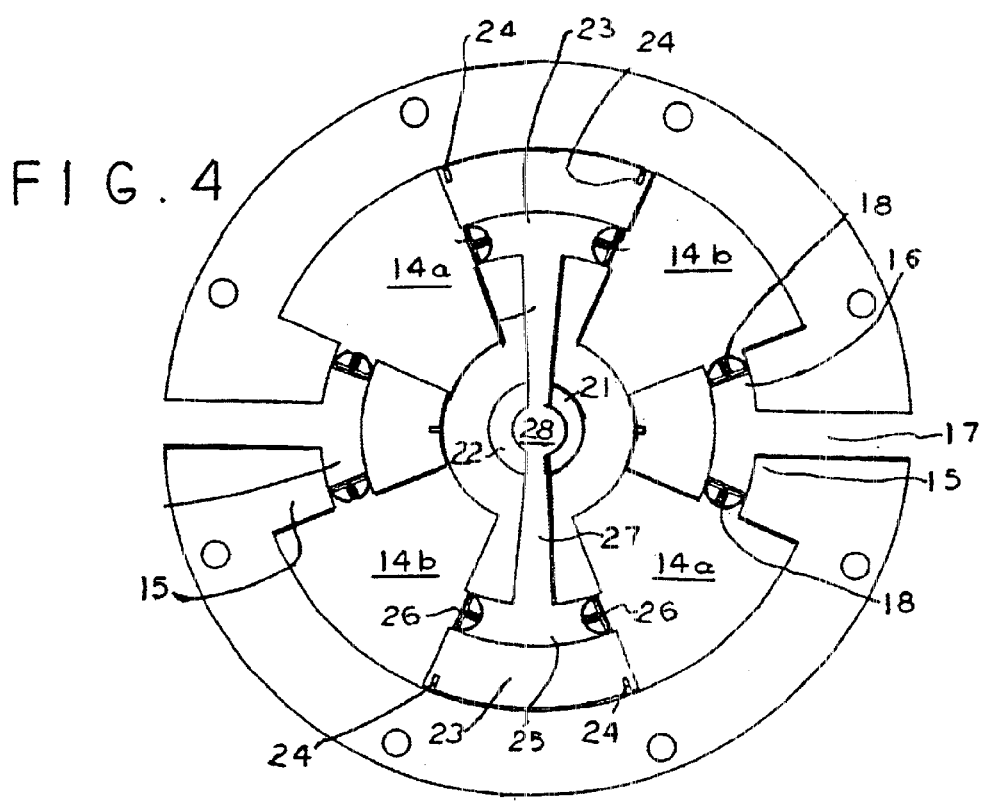
FIG. 4 is a radial section taken on line IV—IV of FIG. 2, FIGS. 5–10 are radial sections taken on line V—V with a combustion rotor in various positions in its cycle.
Figure 6:
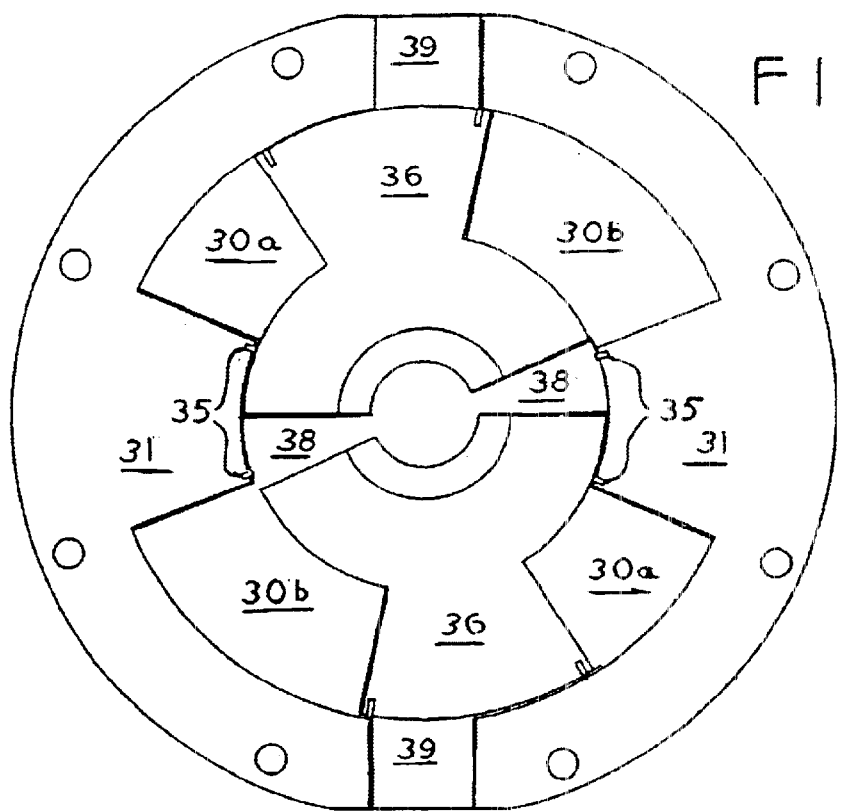
Figure 7:
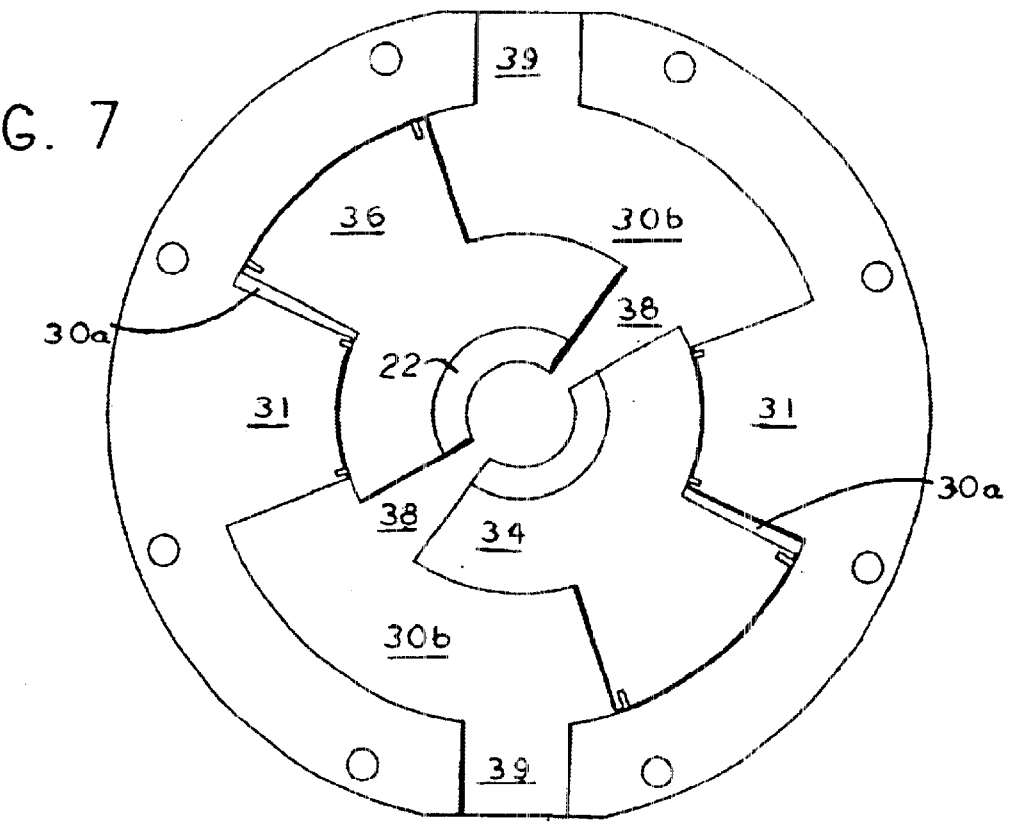

Turning now to the operation of the combustion chambers 30, starting with FIG. 5 in which the radial passages 38 are blocked between the seals 35 of the compression bulkheads 31. In this position the axial bore 28 of the shaft 22 and the bores 25, 27 in the compression pistons 23 are charged with fuel/air mixture and the second combustion chambers 30b hold the combustion products from a previous cycle. As the combustion pistons 36 move anti-clockwise, the radial passages 38 move past one of the seals 35 so as to open into the second combustion chambers 30b as shown in FIG. 6. At this point the second combustion chambers 30b are about to open to the exhaust openings 39. In FIG. 7 the exhaust is fully open and so is the passage 38. Fresh fuel/air mixture drives out the exhaust products and the combustion pistons 36 are at the anti-clockwise end of their travel.

Figure 8:
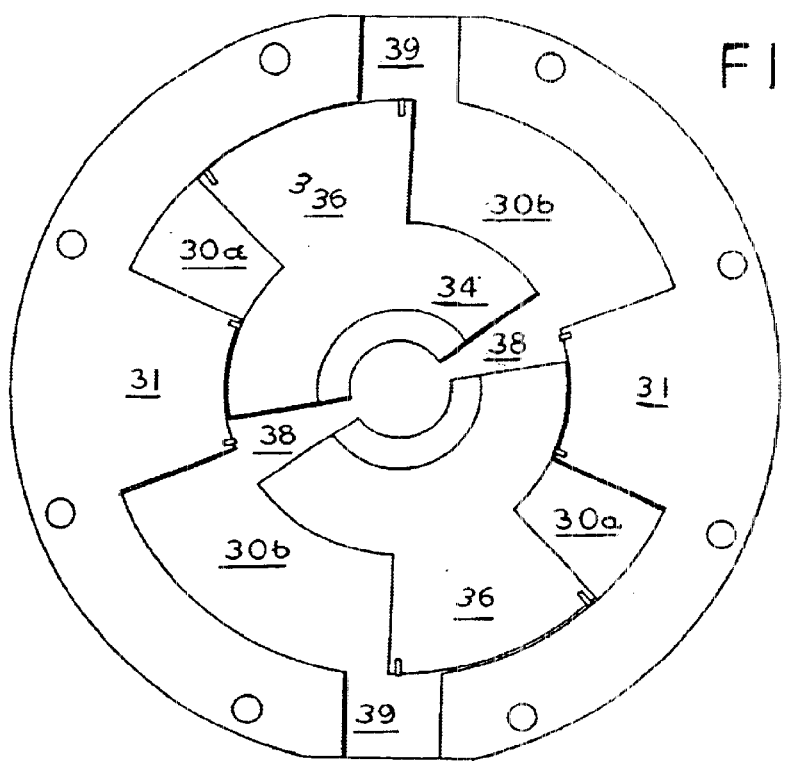
Figure 9:
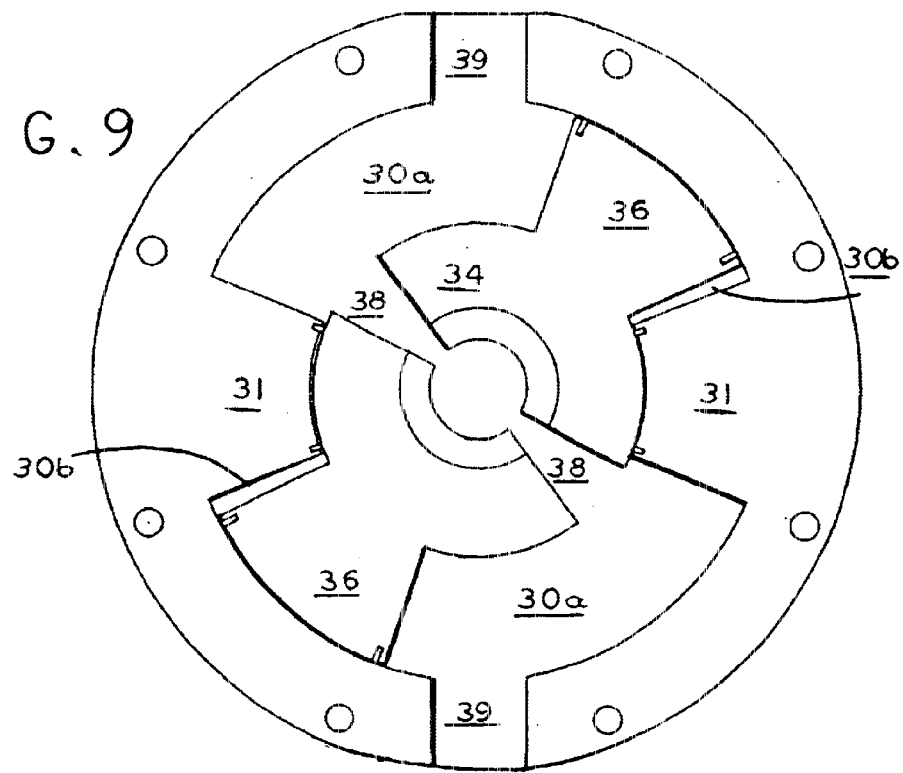
Figure 10:
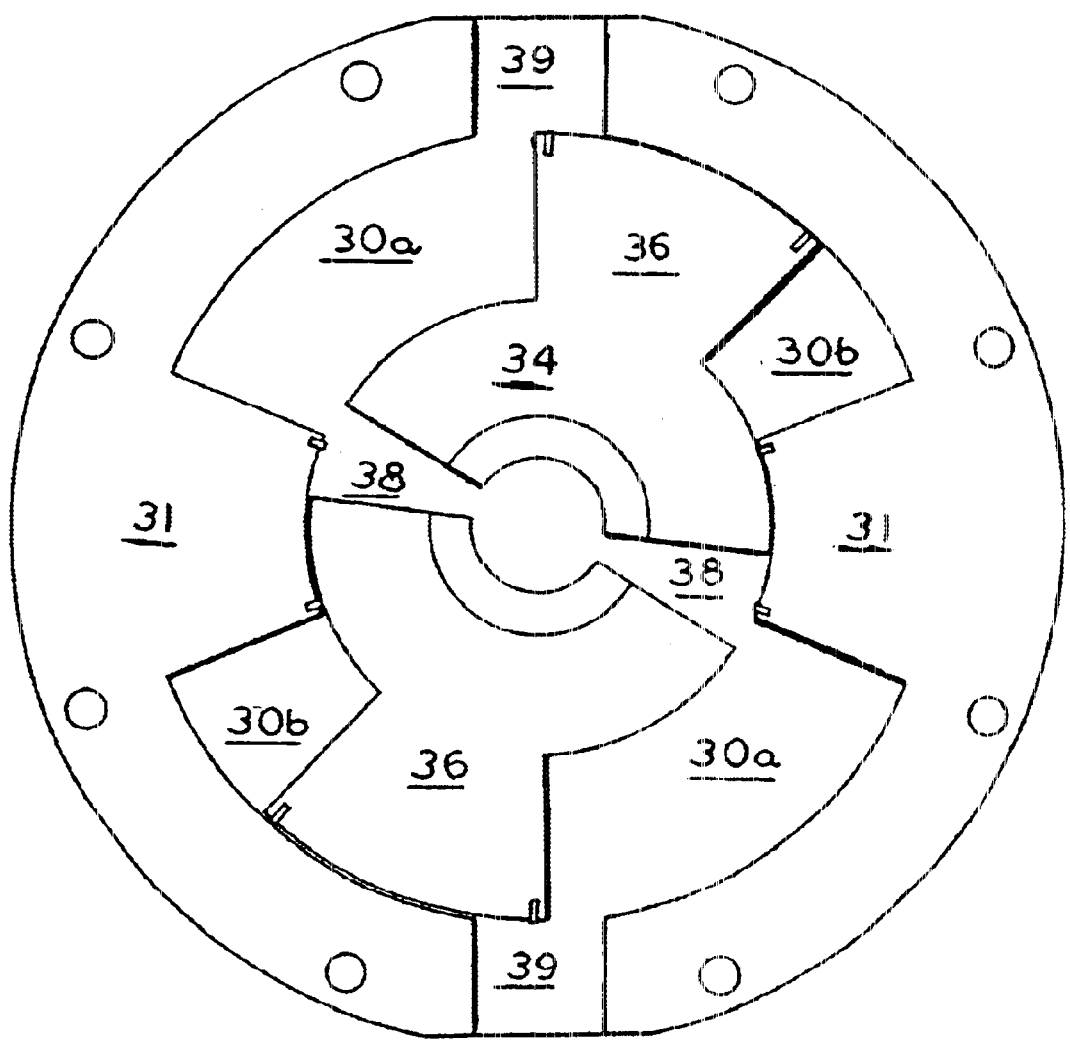

As the combustion pistons 36 return in a clockwise direction, the exhausts 39 and the radial passages 38 begin to close off as shown in FIG. 8. When the exhausts 39 and the radial passages 38 no longer communicate with the second combustion chambers 30b then the mixture in the second combustion chambers 30b is compressed until the combustion pistons 36 reach the clockwise limit of their travel as shown in FIG. 9. Ignition then occurs causing the mixture to combust and expand thus driving the pistons 36 back in an anti-clockwise direction as shown in FIG. 10. Further anti-clockwise rotation returns the pistons 36 to the position shown in FIG. 5 and the engine enters another cycle.

It will, of course, be apparent to the skilled reader that a similar sequence of events is occurring in combustion chambers 30a, but at opposite times. In other words, combustion in the first combustion chambers 30a occurs at the rotor position shown in FIG. 7 whilst the second combustion chambers 30b are exhausting and a new charge of fuel/air mixture is entering the second combustion chambers 30b. The cycle for the first combustion chambers 30a can also be followed in FIGS. 5 to 10.

The shaft 22 can then be linked to a suitable mechanism to produce a desired output. For example the shaft can be linked to a compressor. In one arrangement, the compressor could be constructed along similar principles to the compression part of the engine described above with the shaft 22 being extended and incorporating a further pair of part toroidal pistons for oscillating in a further pair of part toroidal cylinders. The further cylinders could incorporate bores 16,17 and one way valves 18 and the pistons could incorporate bores 25, 27 and one way valves 26 like in the engine compression stage. Air would be compressed and expelled through an axial bore in the shaft extension.

The above described engine is advantageous in that there is only one moving part, namely the unitised rotor, which oscillates about the central axis of the engine. Also, the compressed air/fuel mixture is transferred to the combustion chambers via internal passage means provided in the rotor. The above-described engine has natural dynamic equilibrium in that energy force in the engine has an equal and opposing force, except for gravity, such that there is no need to manufacture opposing forces or to counter-balance in order to gain equilibrium.

With the engines described herein, it is also possible to manufacture the circumferentially facing surfaces of the combustion pistons and bulkheads as concave surfaces, perhaps part-spherical, in order to improve combustion.

Figure 11:
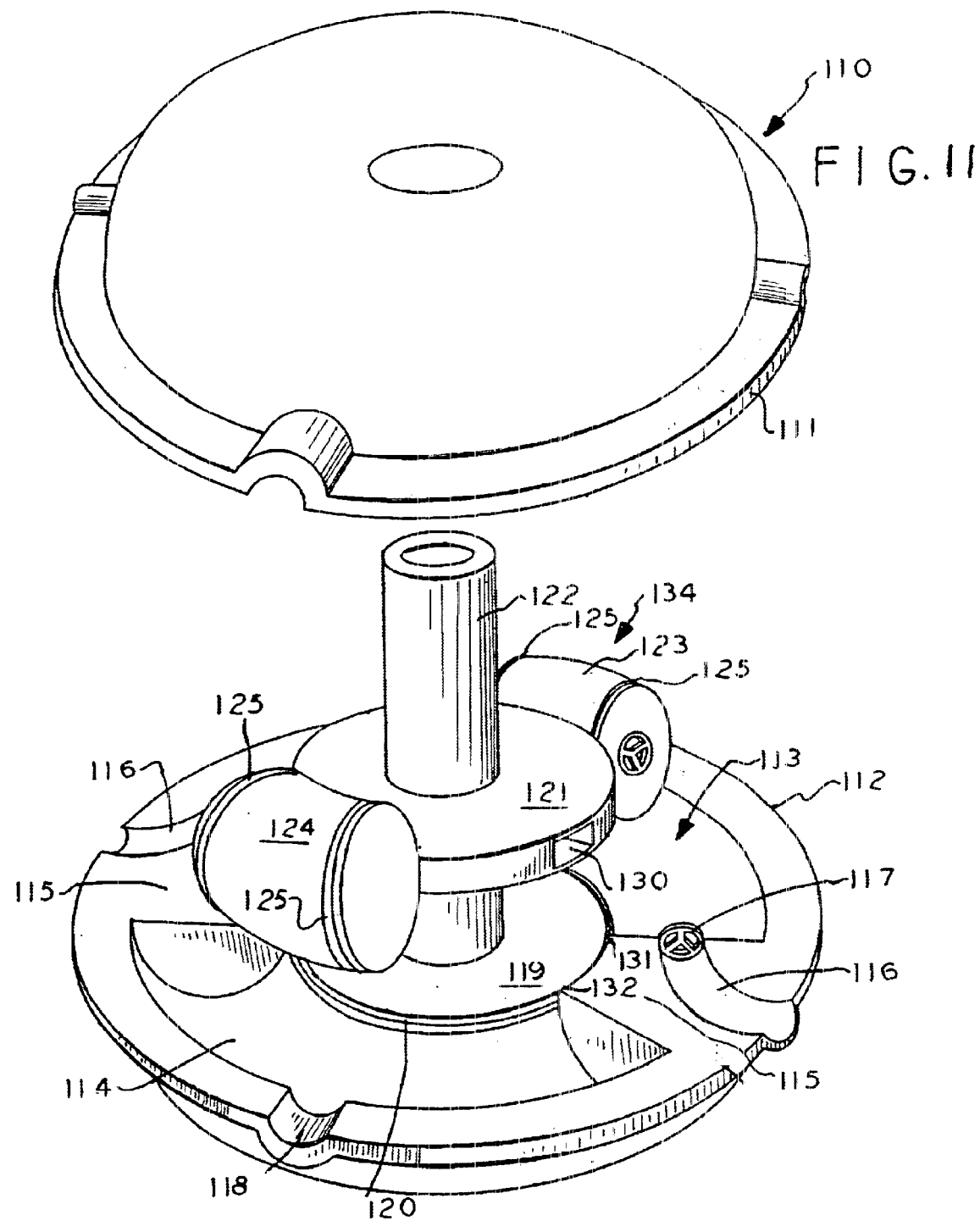
FIG. 11 is an exploded perspective view of an alternative internal combustion engine according to the present invention.
Figure 12:
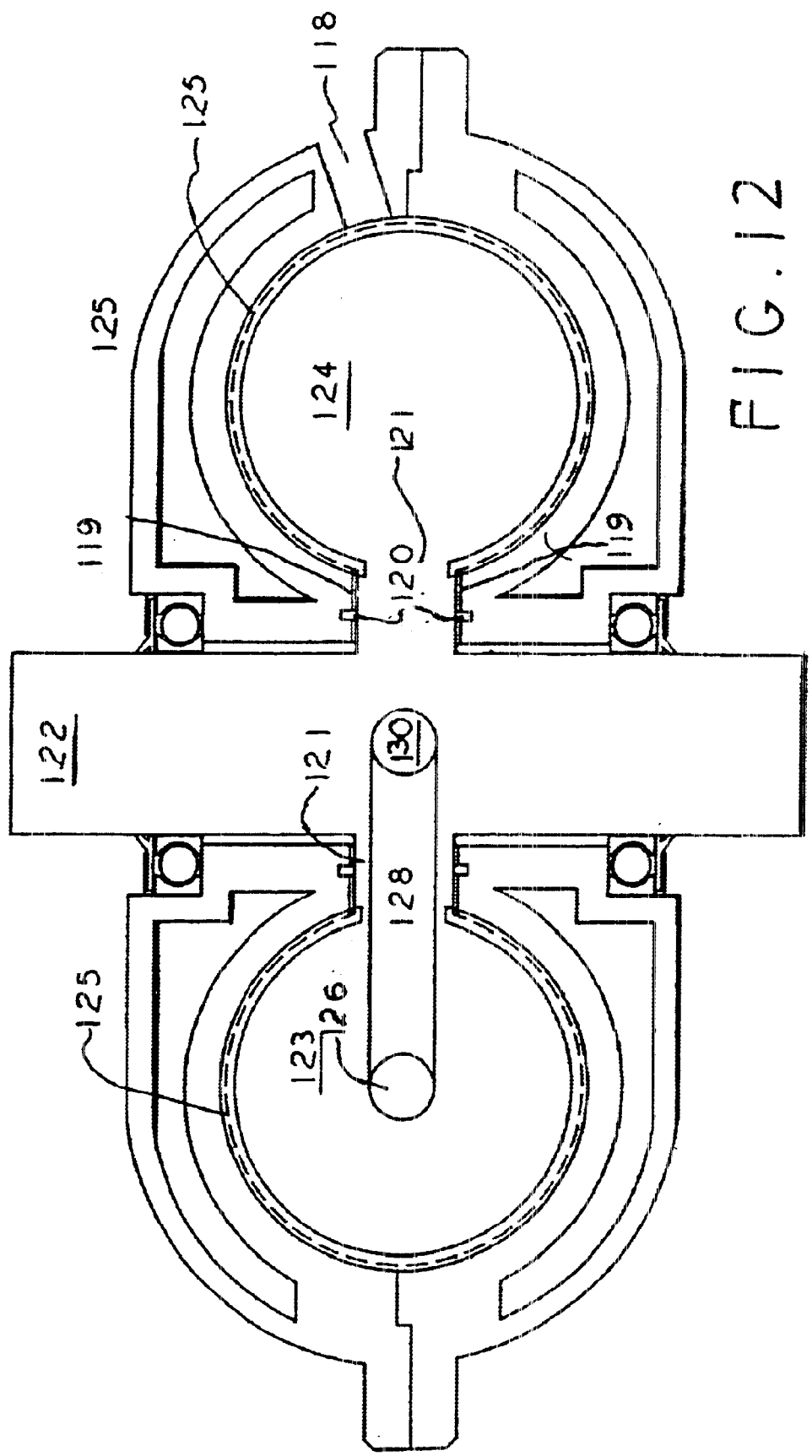
FIG. 12 is a vertical section through the engine of FIG. 11.
Figure 13:
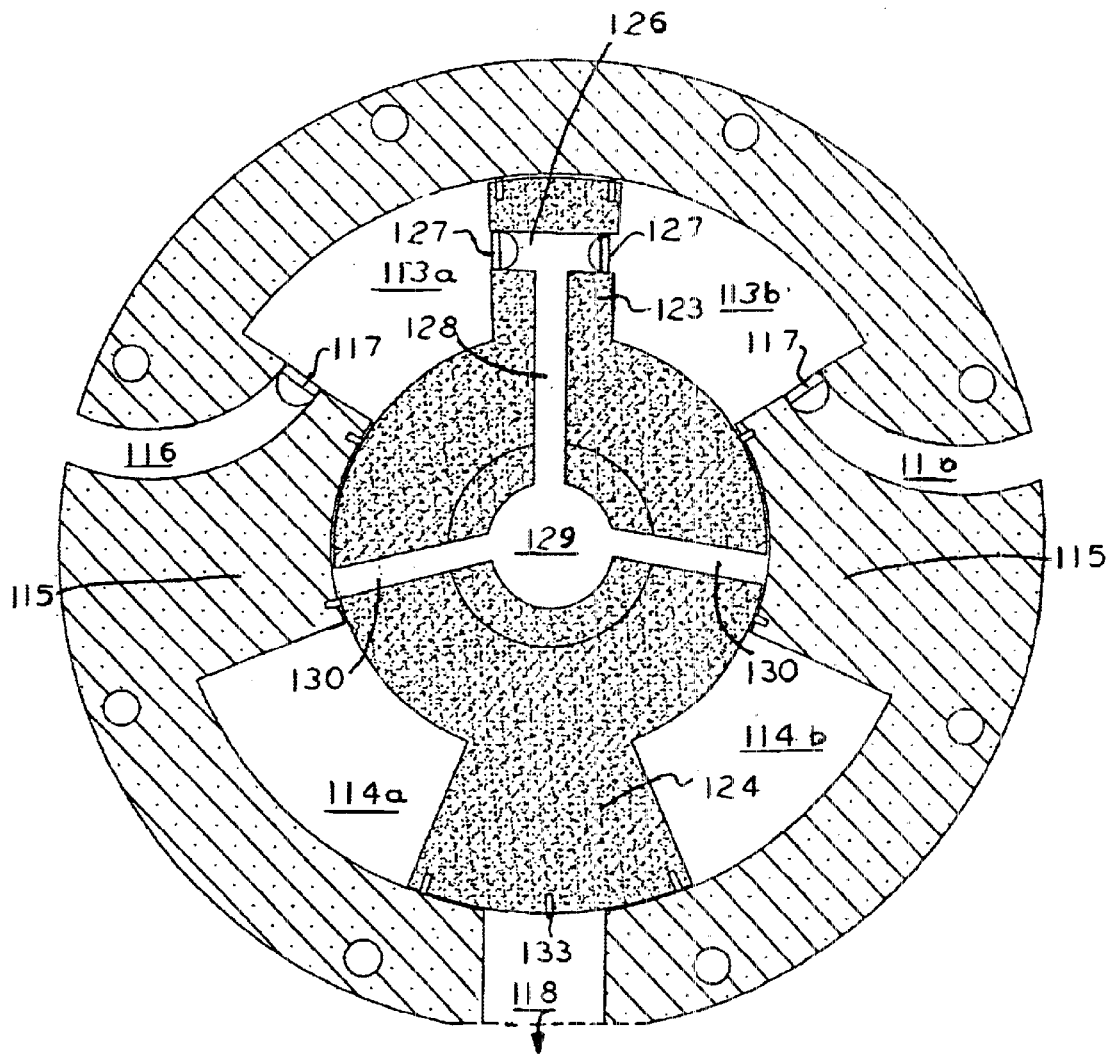
FIG. 13 is a radial section on line XIII—XIII of FIG. 12, showing a rotor in one position of its cycle.

FIGS. 11 to 13 show an alternative arrangement of internal combustion engine 110 which is similar in many aspects of operation as that shown in FIGS. 1 to 10. The engine 110 has an upper housing 111 and a lower housing 112 which are securable to each other by means of bolts, for example. The axially facing surfaces of the two housings define therebetween a compression chamber 113 and an oppositely disposed combustion chamber 114. The compression chamber 113 and the combustion chamber 114 are separated from each other by a pair of bulkheads 115. Both chambers 113 and 114 are part-toroidal in shape and, in this arrangement, are circular in radial cross section.

Each bulkhead 115 has an arcuate bore 116 extending from the exterior of the housing to each of the circumferential end faces of the combustion chamber 114. Each arcuate bore 116 has a one-way valve 117 which allows passage of a suitable fuel/air mixture only into the compression chamber 113. An exhaust opening 118 is provided in the housing and leads from the combustion chamber 114 at a location generally midway between the two bulkheads 115.

The central part of the upper and lower housings 111, 112, between the compression chamber 113 and the combustion chamber 114, provide a pair of opposed circular bearing surfaces 119, each incorporating a circular sealing element 120. Between the bearing surfaces 119 is disposed a central hub 121 which is mounted on an axially extending main shaft 122 which extends centrally through the engine. The central hub 121 is able to rotate between the bearing surfaces 119 and sealingly engages the pair of bulkheads 115, a seal 131 being provided at the circumferential end of each bulkhead adjacent the compression chamber 113 and another seal 132 being provided at the circumferential end of each bulkhead adjacent the combustion chamber 114, the seals 131, 132 being provided for sealing engagement with the central hub 121.

Extending from opposite sides of the central hub 121 are a part-toroidal compression piston 123 and a part-toroidal combustion piston 124, each of which has a circular cross-section respectively corresponding to the compression chamber 113 and the combustion chamber 114 for rotary sliding movement therein about the central axis of the engine. A circular seal 125 is provided at the circumferential ends of each the compression piston 123 and the combustion chamber 124 for sealing said rotary sliding movement in the compression chamber 113 and the combustion chamber 14 respectively. The compression chamber 113 is, therefore, divided into fist and second compression chambers 113a, 113b and the combustion chamber 114 is divided into first and second combustion chambers 114a, 114b. A further circular seal element 133 is provided on the combustion piston 124, midway between the seals 125. The compression piston 123 and the combustion chamber 124, the central hub 121 and the shaft 122 together form a rotor 134 which rotates as a single unit.

The compression piston 123 has a circumferentially extending through bore 126 which opens into the adjacent first and second compression chambers 113a, 113b by way of one-way valves 127 which allow passage of mixture only into the compression piston 123. The through bore 126 communicates with a radial bore 128 which extends through the central hub 121 and into an axial chamber 129 formed in the shaft 122. Two angled radial bores 130 extend from the chamber 129 for communication with the respective combustion chambers 114a, 114b or to be closed by the bulkheads 115 between the seals 131, 132 depending on the position of the rotor.

Although this description does not show the various positions of the rotor 134 during its cycle of operation, this will be apparent from the drawings and from a comparison with the engine shown in FIGS. 1 to 10. Considering the first compression chamber 113a, as the rotor moves clockwise fuel/air mixture is drawn in through one way valve 117. When the rotor 134 reaches the clockwise extent of its travel, it returns anti-clockwise to compress the mixture in the first compression chamber 113a. The compressed mixture can then pass through one-way valve 127 into the rotor 134. The mixture is held in the rotor 134 until the left hand radial bore 130 clears the seal 132 in the left hand bulkhead. The mixture is then drawn into the first combustion chamber 114a and the combustion products from a previous combustion are expelled through the exhaust opening 118. When the rotor reaches the end of its anti-clockwise travel it returns clockwise to close the exhaust, block the left hand radial bore 130 and compress the fuel/air mixture in the first combustion chamber 114a. At the clockwise limit of travel of the piston, the mixture in the first combustion chamber is ignited thus causing the rotor 134 to return in the anti-clockwise direction. A similar process is, of course, occurring in the second compression and combustion chambers 113b, 114b.

It will be appreciated that alternative shapes and configurations are possible with more compression/combustion chambers/pistons being included. Also the cross-sections of the part-toroidal pistons/chambers could be non-circular.

What is claimed is:

1. An internal combustion engine comprising:
    a housing; and
    a rotor mounted for oscillating rotary movement therein;
    wherein the housing defines each of compression chambers and each of associated combustion chambers;
    wherein the rotor defines for each chamber piston means for sealed sliding motion therein to constitute said oscillating rotary movement; and
    wherein the rotor provides internal passage means for selectively communicating between each of the compression chambers and each of the respectively associated combustion chambers.

2. The internal combustion engine as defined in claim 1, wherein each of cylinders is part-toroidal and each of associated piston means is correspondingly part-toroidal for sliding therein.

3. The internal combustion engine as defined in claim 2, wherein each of the cylinders is substantially circular in radial cross-section.

4. The internal combustion engine as defined in claim 1 wherein the rotor comprises a central shaft which extends through the housing and which is supported by means of bearings for rotation relative to the housing.

5. The internal combustion engine as defined in claim 1 wherein the housing provides inlet means incorporating one way valves for supplying fuel mixture to each of the compression chambers, and exhaust means for discharging combustion products from the each combustion chamber.

6. The internal combustion engine as defined in claim 5, wherein, the housing provides a pair of identical compression chambers in a common plane, the pair of the identical compression chambers being oppositely disposed and being separated by a pair of compression bulkheads which extend radically inwardly.

7. The internal combustion engine as defined in claim 6 wherein each of the compression bulkheads incorporates sail inlet means.

8. The internal combustion engine as defined in claim 7 wherein said inlet means in each of the compression bulkheads comprises a radially extending inlet bore which terminates with each of the cross-bores; and
    wherein each of the cross-bores opens into one of the compression chambers at one end, and into the other of the compression chambers at the other end, the one way valves being disposed in each of the cross bores to allow the fuel mixture to supply only into each of the compression chambers.

9. The internal combustion engine as defined in claim 6, wherein a pair of oppositely disposed compression pistons extend from the first central hub provided on the shaft, the central hub sealingly engaging and rotating relative to the pair of compression bulkheads and each of the compression pistons dividing each of the compression chambers into first and second parts.

10. The internal combustion engine as defined in claim 9, wherein the internal passage means comprises a through bore in each of the compression pistons, the through bore communicating with a radical bore extending inwardly through each of the compression pistons, and through the central hub to an axially extending bore in the shaft.

11. The internal combustion engine as defined in claim 10 wherein ends of the through bore open into each of the compression chambers, and have one way valve to allow the fuel mixture to the radial bore.

12. The internal combustion engine as defined in claim 6, wherein the housing provides a pair of identical combustion chambers in a single plane axially spaced from the common plane of the pair of the compression chambers, the pair of identical combustion chambers being oppositely disposed and being separated by a pair of identical combustion bulkheads which extend radially inwardly.

13. The internal combustion engine as defined in claim 12, wherein the exhaust means comprises an exhaust passage extending substantially radially through an outer peripheral of the housing and opening centrally into each of the combustion chambers.

14. The internal combustion engine as defined in claim 12 or claim 13, wherein a pair of oppositely disposed combustion pistons extend from a second central hub provided on the shaft, the second central hub sealingly engaging and rotating relative to the pair of combustion bulkheads and each of the combustion pistons dividing each of the combustion chambers into two parts.

15. The internal combustion engine as defined in claim 14 wherein the internal passage means further comprises oppositely disposed radically extending openings from the axial bore in the shaft through the second central hub for selective communications with each of the respective combustion chambers depending on the position of the rotor.

16. The internal combustion engine as defined in claim 15 wherein each radial opening in the second central hub opens centrally between the pair of the combustion pistons.

17. The internal combustion engine as defined in claim 1 wherein the housing provides a compression chamber and an oppositely disposed combustion chamber in a common plane, the compression chamber and the combustion chamber being separated by a pair of identical bulkheads which extend radially inwardly.

18. The internal combustion engine as defined in claim 17 wherein the identical bulkheads has an inlet passage opening into the compression chamber via a one way valve.

19. The internal combustion engine as defined in claim 17
    wherein the rotor comprises a central shaft and a central hub which sealingly relative to the pair of the identical bulkheads,
    wherein a compression piston extending from the central hub for sliding oscillation within the compression chamber, and
    wherein a combination piston extending from the central hub for sliding oscillation within the combustion chamber.

20. The internal combustion engine as defined in claim 19 wherein the compression piston has a through bore with a one way valve at each circumferential end,
    wherein through bore communicates with a radial bore,
    wherein the radial bore extends inwardly through the compression piston and through the central hub to the shaft;
    wherein two radial passages extend through the central hub either to open into the each of respective combustion chambers or to be blocked by the each of respective identical bulkheads depending on the location of the rotor relative to the housing.

21. The internal combustion engine as defined in claim 17 wherein the housing further provides an exhaust opening from the combustion chamber and wherein the opening being centrally disposed between the pair of identical bulkheads.

22. The internal combustion engine as defined in claim 1 wherein the internal passage means in the rotor constitutes a reservoir for compressed gasses.

* * * * *